United States Patent [19]
Hall et al.

[11] Patent Number: 5,898,831
[45] Date of Patent: Apr. 27, 1999

[54] INTERACTIVE APPLIANCE SECURITY SYSTEM AND METHOD

[75] Inventors: Phillip Earl Hall, Scottsdale; Jeffrey Martin Harris; Ernest Earl Woodward, both of Chandler; Ronald W. Borgstahl, Phoenix, all of Ariz.

[73] Assignee: Motorola, Inc., Schaumburg, Ill.

[21] Appl. No.: 08/766,652

[22] Filed: Dec. 16, 1996

[51] Int. Cl.$^6$ ................................................. G06F 11/00
[52] U.S. Cl. ................................................. 395/187.01
[58] Field of Search ........................ 395/188.01, 187.01, 395/186, 185.08, 200.59; 380/23, 25

[56] References Cited

U.S. PATENT DOCUMENTS

| | | | |
|---|---|---|---|
| 4,097,696 | 6/1978 | Nyhuis et al. | 179/2 |
| 4,512,033 | 4/1985 | Schrock | 455/2 |
| 4,648,123 | 3/1987 | Schrock | 455/67 |
| 5,221,838 | 6/1993 | Gutman et al. | 235/379 |
| 5,428,821 | 6/1995 | Krisna et al. | 455/54.1 |
| 5,491,791 | 2/1996 | Glowny et al. | 395/183.16 |
| 5,550,984 | 8/1996 | Gelb | 395/187.01 |
| 5,623,601 | 4/1997 | Vu | 395/187.01 |
| 5,629,981 | 5/1997 | Nerlikar | 380/25 |
| 5,694,335 | 12/1997 | Hollenberg | 364/514 |

*Primary Examiner*—Robert W. Beausoliel, Jr.
*Assistant Examiner*—Scott T. Baderman
*Attorney, Agent, or Firm*—Michael D. Bingham; Lanny L. Parker

[57] ABSTRACT

In a personal area network, a method for including an appliance (121). The method includes steps of a) determining, by the personal area network (120), that the appliance (121) should be included in the personal area network (120); b) determining (253) that all individual members (121) of the personal area network (120) are in data communication with the personal area network (120); and c) when all individual members (121) of the personal area network (120) are in data communication with the personal area network (120), performing substeps of: i) selecting (259) a selected member (121) of the personal area network (120); ii) programming (261) security criteria relevant to the selected member (121) into the appliance (121); and iii) programming (263) security criteria relevant to the appliance (121) into the selected member (121).

25 Claims, 12 Drawing Sheets

APPLIANCE CIRCUITS — 48
PDA
TELEVISION
RADIO
CD PLAYER
TAPE PLAYER
COPIER
FACSIMILE
TELEPHONE
CELL PHONE
CORDLESS PHONE
PAGER
WATCH
COMPUTER
POS TERMINAL
AUTOMATED TELLER
⋮

*FIG. 3*

RELAY INTERFACE — 44
MODEM – PSTN
NETWORK – LAN
NETWORK – WAN
MODEM – SATELLITE
CELL PHONE – PSTN
TELEPHONE – PSTN
⋮

*FIG. 4*

| I/O | | 46 |
|---|---|---|
| INPUT DEVICES | OUTPUT DEVICES | |
| KEYBOARD<br>POINTING DEVICE<br>OPTICAL SCANNER<br>MICROPHONE<br>⋮ | PRINTER<br>MODEM<br>SPEAKER<br>⋮ | |

*FIG. 5*

| NEED/CAPABILITY MESSAGE | | | | | 64 |
|---|---|---|---|---|---|
| PEER ID | AUTHORIZATION KEY | NEED(S) SPECIFICATION | CAPABILITIES SPECIFICATION | ... | |
| 66 | 68 | 70 | 72 | | |

*FIG. 7*

| NEED TABLE | | 74 |
|---|---|---|
| CODE | MEANING | |
| — | APPLIANCE PERSONALIZATION (E.G., OWNERS NAME) | |
| — | HARD COPY (E.G., PRINT) | |
| — | VISUAL IMAGE (E.G., DISPLAY) | |
| — | AUDIO (E.G., HIGH FIDELITY) | |
| — | GATEWAY (E.G., INTERNET) | |
| — | FINANCIAL TRANSACTIONS (E.G., POS, POINT OF SALE) | |
| — | LOCK/UNLOCK (E.G., SECURITY ENABLE/DISABLE) | |
| ⋮ | ⋮ | |

*FIG. 8*

| CAPABILITY TABLE | | 76 |
|---|---|---|
| CODE | MEANING | |
| — | APPLIANCE PERSONALIZATION (E.G., OWNERS NAME) | |
| — | HARD COPY (E.G., PRINT) | |
| — | MULTIMEDIA (E.G., REAL TIME VIDEO) | |
| — | VOICE (E.G., SPEECH) | |
| — | AUDIO (E.G., HIGH FIDELITY) | |
| — | GATEWAY (E.G., INTERNET) | |
| — | FINANCIAL TRANSACTIONS (E.G., POS, POINT OF SALE) | |
| — | LOCK/UNLOCK (E.G., SECURITY ENABLE/DISABLE) | |
| ⋮ | ⋮ | |

*FIG. 9*

INTERACTIVE APPLIANCE SECURITY SYSTEM AND METHOD

CROSS-REFERENCE TO RELATED APPLICATIONS

This application is related to co-pending application Ser. No. 08/729,207, filed on Oct. 4, 1996, and co-pending application Ser. No. 08/762,127, filed on Dec. 9, 1996, which are assigned to the same assignee as the instant application.

TECHNICAL FIELD OF THE INVENTION

The present invention relates generally to data communication networks. More specifically, the present invention relates to a peer-to-peer network in which node addressing is dynamically configurable.

BACKGROUND OF THE INVENTION

In a typical day many people come into contact with a massive number of electronically controlled devices. Such devices range from automobiles and appliances, to home and office equipment and to telephones and televisions to name but a few. Many of these devices are required to move from time to time. Many of these devices are even portable. These devices provide a vast and diverse assortment of services for the people coming into contact with them. However, they suffer from a common problem related to user input and output (I/O).

User I/O refers to components and processes used to communicate user-supplied data to an electronic device and to annunciate data from an electronic device so the data may be perceived by a user. Although electronic devices provide a vast and diverse assortment of services, they tend to have redundant I/O. In other words, many such devices have displays, speakers and the like at which data may be annunciated and have buttons, switches, keypads and other controls at which user-supplied data may be communicated to the devices. In order to keep costs low and size small, user I/O capabilities often suffer. As a result, many electronic devices encountered in everyday life and particularly many portable devices, are cumbersome and tedious to use because communicating data from a user to the devices is difficult and because provisions are unavailable for clearly annunciating data for a user's benefit.

In theory, this user I/O problem could be ameliorated by better integrating electronic devices to ease data communications therebetween. For example, a portable telephone could receive a facsimile (fax), but typically has no capability to print the fax and typically has no capability to communicate with a printer which may be able to print the fax. Likewise, a pager may receive a call-back phone number, but typical pagers have no capability to transfer the call-back number to a telephone from which the call-back can be made. User involvement is required to address these and many other data transfer issues. While many conventional data communication or computer network architectures are known, the conventional architectures are unsuitable for the task of integrating a plurality of electronic devices which collectively provide a vast and diverse assortment of services.

Conventional computer networks require excessively complicated setup or activation procedures. Such setup and activation procedures make the jobs of forming a connection to a new network node and making changes in connectibility permission cumbersome at best. Setup and activation procedures are instituted, at least in part, to maintain control of security and to define network addresses. Typically, a system administration level of security clearance is required before access is granted to network tables that define the network addresses. Thus, in conventional networks, many network users lack sufficient security clearance to activate and obtain addresses of network nodes with which they may wish to connect on their own.

Once setup is performed, either directly by a user or by a system administrator, connections are formed when an initiating node presents the network with the address of a network node to which a connection is desired. The setup or activation requirements of conventional networks force nodes to know or obtain a priori knowledge of node addresses with which they wish to connect prior to making the connection. Excessive user attention is involved in making the connection through setup procedures and during the instant of connection to obtain addresses. This level of user involvement leads to an impractical network implementation between the everyday electronic devices with which people come into contact.

Further, conventional computer networks tend to be infrastructure intensive. The infrastructure includes wiring, servers, base stations, hubs and other devices which are dedicated to network use but have no substantial non-network use to the computers they interconnect. The use of extensive network components is undesirable for a network implementation between everyday electronic devices because an immense expense would be involved to support such an infrastructure and because it impedes portability and movability of nodes.

The use of wiring to interconnect network nodes is a particularly offensive impediment to the use of conventional networks because wiring between diverse nodes is not suitable when some of the nodes are portable. Wireless communication links could theoretically solve the wiring problem, and conventional wireless data communication networks are known. However, the conventional wireless networks do little more than replace wire lines with wireless communication links. An excessive amount of infrastructure and excessive user involvement in setup procedures are still required.

BRIEF DESCRIPTION OF THE DRAWINGS

A more complete understanding of the present invention may be derived by referring to the detailed description and claims when considered in connection with the Figures, wherein like reference numbers refer to similar items throughout the Figures and :

FIG. 3 shows a list of appliance circuits which may be included in the hardware illustrated in FIG. 2;

FIG. 4 shows a list of gateways which may be included in the hardware illustrated in FIG. 2;

FIG. 5 shows a list of I/O devices which may be included in the hardware illustrated in FIG. 2;

FIG. 7 is a data format diagram of an exemplary need/capability message communicated from a peer to initiate a setup connection;

FIG. 8 shows an exemplary need table which identifies possible network service needs which might occur at a peer;

FIG. 9 shows an exemplary capability table which identifies possible network capabilities which may be provided by a peer;

DETAILED DESCRIPTION OF THE DRAWINGS

Figure 1:
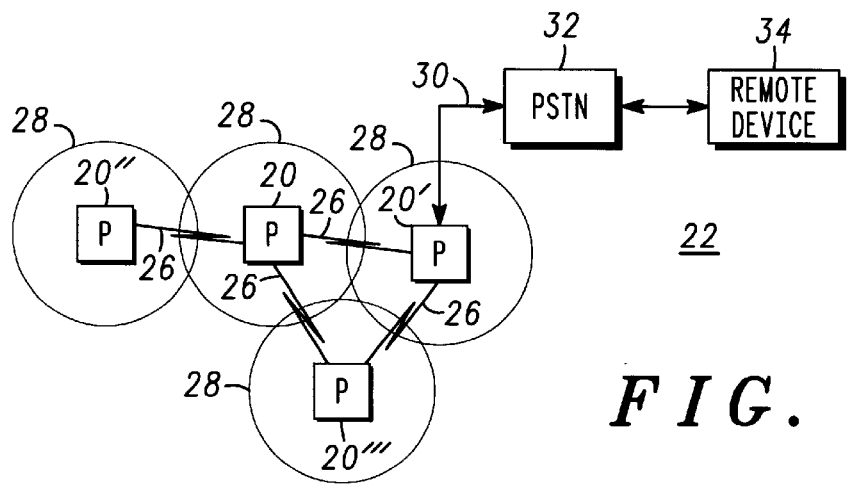
FIG. 1 is a layout diagram depicting exemplary relationships between various peers in a wireless peer-to-peer data communication network configured in accordance with the teaching of the present invention.

FIG. 1 is a layout diagram depicting relationships between various peers (P) 20 in capability addressable, wireless, peer-to-peer data communication network 22 configured in accordance with the teaching of the present invention. While FIG. 1 shows only few peers 20, virtually any computer or microprocessor controlled electronic device throughout the world may serve as a peer 20. Accordingly, network 22 supports an unlimited number of possible connections between peers 20.

As used herein, the term "peer-to-peer" is defined to mean having at least common portions of communications protocol and/or capability and does not refer to equivalence of physical size, functional capability, data processing capacity or transmitter/receiver range or power. Each peer or communication node 20 of communications network 22 may establish a personal area network. For example, a first and a second of nodes 20 first find or determine that each other is a compatible node. Then, as a result of self-initiated processes, first and second nodes 20 form the personal area network. First and second nodes 20 must detect that they are in a particular proximity to one another and if so a communication link is established. This link may be accomplished by known RF, IR, optical or acoustic techniques or by conduction through a living body. When a link is established, first and second nodes 20 exchange what their needs and capabilities are. When needs and capabilities are not able to be satisfied or matched, one of first and second nodes 20 may alternately route the communications link to a third communication node 20. Put another way, a communications platform that includes at least two nodes having overlapping communications regions could also include means for exchanging needs and capabilities information between the at least two nodes for forming a communication network.

Network 22 is desirably configured in a peer-to-peer architecture so that only a minimal number of network-specific components are used and no fixed infrastructure is required. In the preferred embodiments, each peer 20 can initiate a connection with other peers 20 without servers being required to manage the connections. Moreover, peers 20 can freely move about without affecting the network structure or requiring the performance of reconfiguration, setup or activation procedures.

Free movement of peers 20 is further supported by using wireless communication links 26 as a physical transport layer in network 22. In the preferred embodiments, wireless communication links 26 are RF links operating in the higher regions of the microwave band so that small, lightweight, inexpensive, omni-directional antennas may be used. However, other RF frequencies, optical links and other wireless communication links known to those skilled in the art may be used as well. The specific protocols used in implementing wireless communication links 26 are not important to the present invention. Various TDMA, FDMA and/or CDMA techniques known to those skilled in the art may be employed. However, all peers 20 in network 22 desirably have the ability to communicate using the protocols, regardless of the capabilities and needs of the peers 20.

FIG. 1 depicts detection zone 28 surrounding each peer 20. In the preferred embodiments, wireless communication links 26 for the vast majority of peers 20 are operated at a sufficiently low power so that a wireless communication range for a given peer 20 is preferably less than 5 meters, although the range may be much greater, for the typical peer 20. The use of this degree of low power transmissions limits interference between independent connections which may share the wireless spectrum at different locations. Moreover, the use of this degree of low power transmissions is compatible with configuring a substantial portion of peers 20 as portable devices. Those skilled in the art will appreciate that hand-portable electronic devices share the characteristics of being physically small, lightweight and including a self-contained power source, such as a battery. Extremely low power transmissions do not severely deplete the reserves of small batteries typically used in portable devices.

While peers 20 may potentially connect through network 22 with a vast multitude of peers 20, use of low power wireless communication links 26 limits the number of potential connections at any given instant in time to those peers 20 which are physically proximate to one another. In other words, only when a first peer 20 resides in the detection zone 28 of a second peer 20 and that second peer 20 resides in the detection zone 28 of the first peer 20, can a connection through network 22 occur.

Rather than specifying a network unique address to initiate a connection, network 22 uses physical proximity along with a needs and capabilities evaluation (discussed below) to target a peer 20 with which a connection is desired. By not specifying a network-unique address to initiate a connection, user involvement in making connections is reduced and network addressing becomes dynamically configurable. Such an addressing scheme is useful in exchanging data between devices a user carries and comes into contact with on a daily basis. Relaying information between peers not in direct communication is also possible. For example, peer 20" may establish a communication link with peer 20''' via peer 20. In this case, peer 20 provides the relay interface between the other two peers.

Not all peers 20 are required to be portable devices. FIG. 1 shows communication link 30, which may or may not include a wireline link, connecting a peer 20' to public switched telecommunication network (PSTN) 32. Through PSTN 32, peer 20' may communicate with a vast assortment of remote devices 34, of which FIG. 1 shows only one. Peer 20' may be powered from a public power network (not shown) so that minimizing power consumption is not a significant design issue. While FIG. 1 depicts only PSTN 32 linking peer 20 to remote device 34, other local area network (LAN), wide area network (WAN) or communication links known to those skilled in the art may connect peers 20 to remote devices 34. Remote devices 34 may or may not themselves be peers 20. While network 22 uses proximity as a factor in targeting peers 20 to which connections are formed, the use of routing, gateway or relaying peers 20' permits connections to be extended over great distances through use of other networks.

Figure 2:
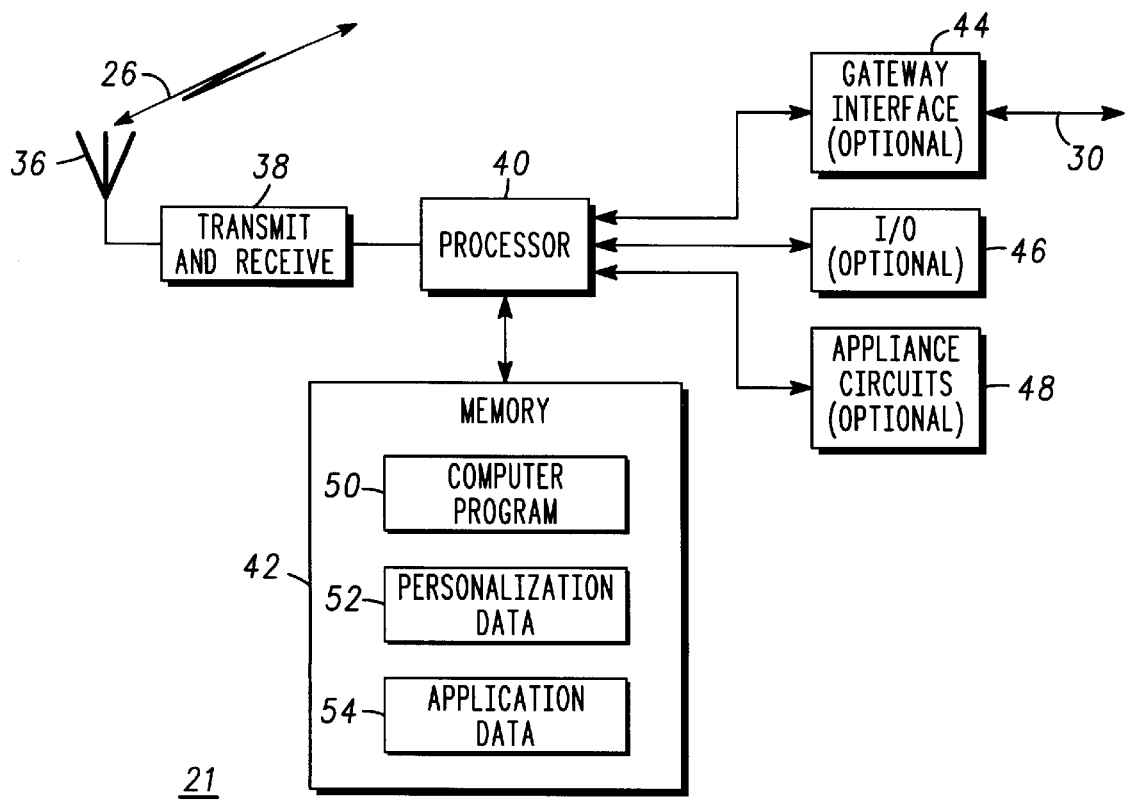
FIG. 2 is a block diagram of hardware included in a peer.

FIG. 2 is a block diagram of hardware 21 included in peer 20. Peer 20 includes antenna 36 configured to support wireless communication link 26. Antenna 36 couples to transmit and receive section 38. Transmit and receive section 38 is compatible with the protocols peers 20 use to communicate with one another. Transmit and receive section 38 couples to processor 40. Processor 40 couples to memory 42, optional gateway 44, communication link 30, optional I/O section 46, transmit and receive unit 38 and optional appliance circuits 48.

Processor 40 executes computer programs 50 which are stored in memory 42. Computer programs 50 define processes performed by processor 40 and peer 20. Memory 42 additionally stores personalization data 52 and application data 54. Personalization data 52 characterize a user or owner of peer 20 and may change from user to user or from time to time. ID codes, passwords and PINs are examples of personalization data as are radio or TV channel presets, language preferences and speed dial telephone numbers. Application data 54 are provided by performing peer applications and may change from moment to moment. A facsimile, a telephone number received over a pager, data scanned in using a bar code reader and a sound snippet received from a microphone or other audio source represent examples of application data.

In one embodiment, the present invention is realized as an integrated circuit for interactively coupling one or more communication nodes in a common network. The integrated circuit includes, in combination, a receiver for receiving input data, a transmitter for transmitting output data and a processor. The processor is coupled to the receiver and transmitter for interactively coupling a first common node to a second common node. The processor includes apparatus for activating a communications link between the first and second common nodes when the first and second common nodes are within a predetermined distance from each other and when needs and capabilities of said first and second common nodes overlap.

FIG. 3 shows a non-exhaustive list of examples of appliance circuits 48 which may be included in a peer 20. Referring to FIGS. 2 and 3, appliance circuits 48 may be configured as any type of a wide variety of everyday, commonly encountered electronically controlled devices, fixed or portable. Thus, a peer 20 may, in addition to being a peer 20, be a personal digital assistant (PDA), television, radio, CD player, tape player, copier, facsimile machine, telephone, cellular telephone, cordless telephone, pager, watch, computer, point of sale (POS) terminal, automated teller or other electronic device.

FIG. 4 shows a non-exhaustive list of gateways 44 which may be included in a peer 20. Referring to FIGS. 2 and 4, gateways 44 may be configured as any of a wide variety of relay, routing or protocol conversion devices known to those skilled in the art. For example, a peer 20 may, in addition to being a peer 20, be a modem which couples peer 20 to PSTN 32 (FIG. 1). Other gateways 44 may couple a peer 20 to LANs or WANs. Still other gateways 44 may couple a peer 20 modem to a satellite, a peer 20 cell phone to PSTN 32, a plain old telephone (POT) peer 20 to PSTN 32.

FIG. 5 shows a non-exhaustive list of I/O devices 46 which may be included in a peer 20. Referring to FIGS. 2 and 5, I/O devices 46 may be classified into input devices and output devices. Input devices may include keyboards, pointing devices, optical scanners, microphones and other well known input devices. Output devices may include printers, monitors, speakers and other well known output devices. Thus, in addition to being a peer 20, a peer 20 may be an I/O device 46.

Those skilled in the art will appreciate that gateways 44, I/O section 46 and appliance circuits 48 are not mutually exclusive categories. For example, many devices fall into multiple categories. For example, a computer considered as an appliance may include both an I/O section and a gateway. Likewise, a gateway may serve an I/O role.

Figure 6:
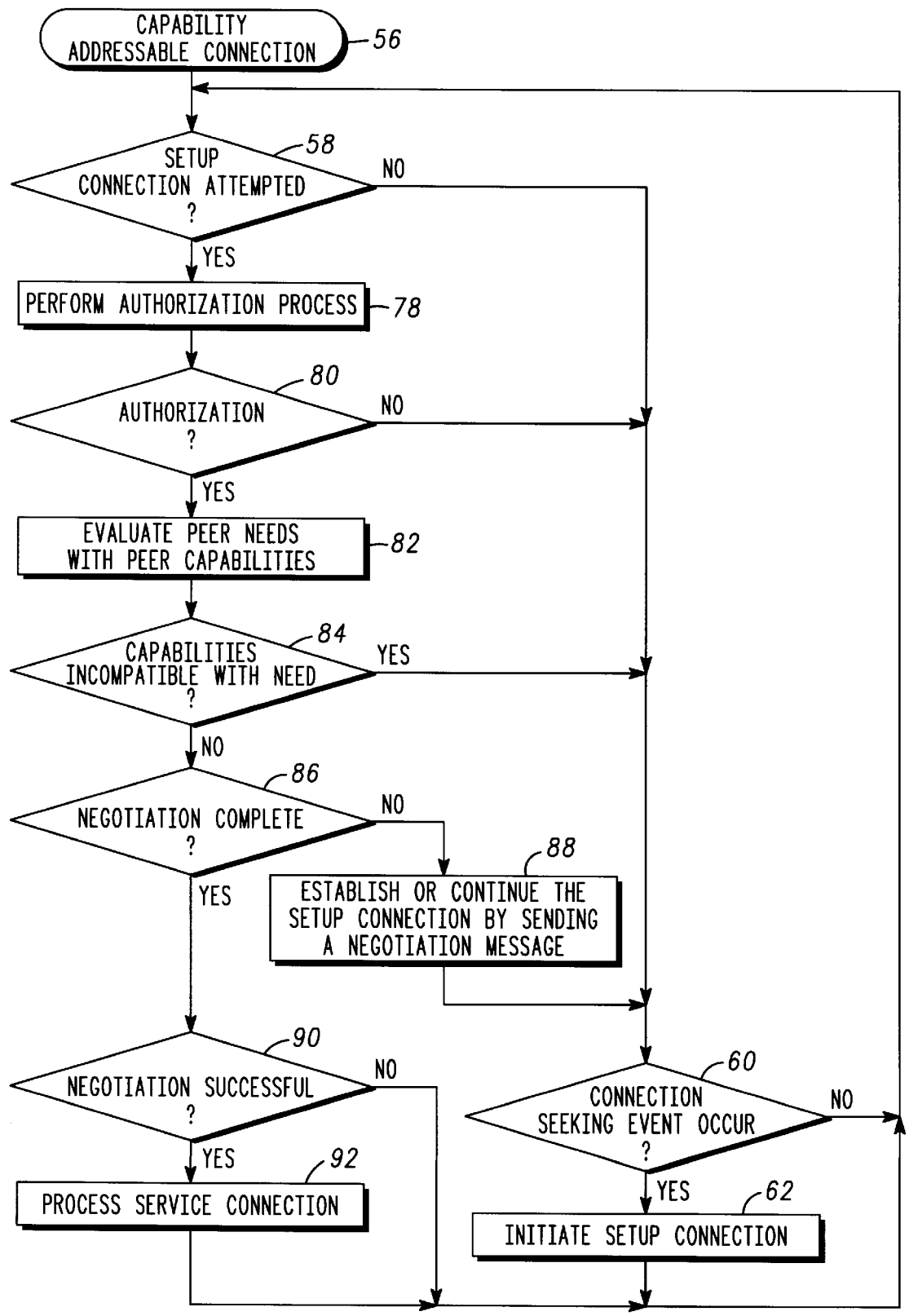
FIG. 6 is a flow chart of exemplary tasks included in a capability addressable connection process performed by a peer.

FIG. 6 is a flow chart of tasks included in a capability addressable connection process 56 performed by a peer 20. Process 56 is defined by a computer program 50 stored in memory 42 of peer 20 (FIG. 2) in a manner well known to those skilled in the art. In the preferred embodiments, all peers 20 perform a process similar to process 56.

Process 56 includes a query task 58 during which peer 20 determines whether a setup connection is being attempted. Generally, task 58 allows a first peer 20 to determine whether a second peer 20 is physically proximate to the first peer 20. Task 58 causes transmit and receive section 38 (FIG. 2) to monitor wireless communication link 26 (FIG. 1) to determine whether a signal compatible with a protocol being used by network 22 (FIG. 1) can be received. Due to the above-described low transmission power levels used by peers 20, when a signal is detected, the peer 20 sending the signal is located near the receiving peer 20.

When task 58 fails to determine that a setup connection is being attempted, a query task 60 determines whether a connection-seeking event has occurred. A connection-seeking event causes a peer 20 to seek out a connection with another peer 20. Connection-seeking events can be triggered using a periodic schedule. For example, connections may be sought out every few seconds. In this example, the schedule may call for more frequent periodic connection attempts from peers 20 which are powered from a public power network and less frequent connection attempts from peers 20 which are battery powered. Connection-seeking events can also be triggered upon the expiration of a fixed or random interval timer or upon the receipt of other external information. The other external information can include information obtained through appliance circuits 48, gateway 44 or I/O section 46 (FIG. 2), including user input.

If task 60 fails to determine that a connection-seeking event has occurred, program control loops back to task 58. If task 60 determines that a connection-seeking event has occurred, process 56 performs a task 62. Task 62 initiates an unsolicited setup connection. The setup connection is not addressed to any particular peer 20 of network 22. Rather, it is broadcast from the peer 20 making the attempt and will be received by all peers 20 within the detection zone 28 (FIG. 1) of the broadcasting peer 20. As discussed below, the broadcast signal need not be answered by another peer 20 even when another peer 20 is in detection zone 28. At this point, the broadcasting peer 20 need not know if any other peer 20 can receive the broadcast signal, and the broadcasting peer 20 may or may not know any particular needs or capabilities of other peers 20 should other peers 20 be sufficiently proximate so that a connection may be formed.

Task 62 initiates a setup connection by broadcasting a need/capability message 64, an exemplary format for which is depicted in FIG. 7. Referring to FIG. 7, message 64 includes an ID 66 for the peer 20 broadcasting message 64, an authorization key 68, a need specification 70, a capability specification 72 and can include other data elements. ID 66 is desirably sufficiently unique within the domain of network 22 so that it may be used in an addressed service connection, should the setup connection prove successful. Authorization key 68 includes one or more data codes which may be used by a receiving peer 20 in performing an authorization process. Needs specification 70 is a list of network needs currently experienced by the broadcasting peer 20. Capability specification 72 is a list of network capabilities which the broadcasting peer 20 may provide to other peers 20 of network 22.

Needs specification 70 may be determined by consulting a need table 74, an exemplary and non-exhaustive block diagram of which is depicted in FIG. 8. As illustrated in FIG. 8, data codes may be associated with a variety of network service needs which a service-requesting peer 20 may experience.

One exemplary need is that of appliance personalization. In the appliance personalization need example, a PDA might need to personalize nearby appliances. To satisfy this need, personalization data 52 (FIG. 2) should be programmed into certain nearby appliances without user intervention. As a result, the certain appliances will always be programmed with a particular user's personalization data whenever that user is near, without requiring action on the user's part, and regardless of prior persons who may have used the appliance.

Other exemplary needs can include that of printing application data 54 (FIG. 2), displaying application data 54, annunciating application data 54 at a speaker, routing connectivity to the Internet or other network resources, POS transactions, passage through secure areas or toll booths and the like.

Capability specification 72 may be determined by consulting a capability table 76, an exemplary and non-exhaustive block diagram of which is depicted in FIG. 9. As illustrated in FIG. 9, data codes may be associated with a variety of network capabilities provided by a service-providing peer 20. For example, a service-providing peer 20 capability can be that of appliance personalization. Thus, a peer 20 may be capable of being personalized by personalization data 52 (FIG. 2). Other examples include capabilities of printing, displaying, annunciating over a speaker, relaying a connection through the Internet or other network or POS terminal and unlocking a secured passageway, to name a few. In general, potential capabilities are compatible with potential needs.

Referring back to FIG. 7, need/capability message 64 includes those codes from tables 74 and 76 (FIGS. 8–9) that currently apply. While a peer 20 may have more than one need or capability at a given instant, nothing requires a peer 20 to have multiple needs or capabilities. Moreover, nothing requires a peer 20 to have both a network need and a network capability. Message 64 serves as a need message if a peer need is specified regardless of whether a peer capability is specified and as a capability message if a peer capability is specified regardless of whether a peer need is specified.

Referring back to FIG. 6, after task 62 broadcasts message 64 (FIG. 7), program control loops back to task 58. When task 58 eventually detects that a setup connection is being attempted by receiving a message 64, task 78 performs an authorization process. Task 78 uses authorization key 68 (FIG. 7) from message 64 to determine if the peer 20 attempting to setup a connection is authorized to connect to the receiving peer 20. Task 78 allows an owner of a peer 20 to restrict access to the owned peer 20 through network 22. The authorization process of task 78 may be used, for example, to restrict personalization capabilities of an appliance to a small family group. Alternatively, a peer 20 having a POS capability may perform an extensive authorization process before permitting a transaction to take place. A peer 20 having a need may also qualify the receipt of provided services depending upon the authorization process provided by task 78.

After task 78, a query task 80 determines whether the authorization process 78 authorized the attempted setup connection. If authorization is denied, program control loops back to task 60. The receiving peer 20 need not reply or otherwise acknowledge the attempted setup connection.

If authorization is accepted, a task 82 evaluates peer needs with peer capabilities. In other words, task 82 causes the message-receiving peer to compare its available capabilities (if any) to any needs listed in a received unsolicited need/capability message 64 (FIG. 7) and to compare its available needs (if any) to any capabilities listed in the message 64. After task 82, a query task 84 acts upon the result of the evaluation of task 82. When no internal capabilities match needs indicated in an unsolicited message 6 and no internal needs match capabilities indicated in an unsolicited message 64, neither peer 20 can be of service to the other. Program control loops back to task 60 and the receiving peer 20 need not reply or otherwise acknowledge the attempted setup connection.

At this point, the vast multitude of potential connections which a peer 20 may make within network 22 has been greatly reduced in scope without the use of network-unique addressing. The low power transmission scheme excludes most peers 20 in network 22 from being connectable at a current instant because most peers 20 will not be proximate one another. Of the few peers 20 which may be within each other's detection zones 28 (FIG. 1), the scope of potential connections has been further limited through the authorization process of task 78 and needs and capabilities evaluation of task 82. Additional exclusions on the remaining potential connections are performed through a negotiation process carried on between a service-requesting peer 20 and a service-providing peer 20.

When task 84 determines that capabilities and needs appear to be compatible, a query task 86 determines whether this negotiation process is complete. If the negotiation process is not complete, a task 88 establishes or otherwise continues the setup connection in furtherance of the negotiation process by sending an addressed negotiation message (not shown) to the peer 20 whose peer ID 66 (FIG. 7) was included in a just-received needs/capabilities message 64. The negotiation message can have a form similar to that of needs/capabilities message 64, but be specifically addressed to the other peer 20.

After task 88, program control loops back to task 60. Subsequent negotiation messages may, but need not, be received. If such subsequent negotiation messages indicate that both peers 20 to the prospective connection have completed negotiation, a query task 90 determines whether the negotiation was successful. When negotiation is not successful, program control loops back to task 58 and no service connection results. However, when negotiation is successful, process service connection procedure 92 is performed. During procedure 92, a one-to-one, addressed connection is established between peers 20 to perform network services. Upon completion of the service connection, program flow loops back to task 58.

While nothing prevents capability addressable connection process 56 from relying upon user intervention during the setup connection process, user intervention is not required. Whether user intervention is required or not should depend upon the security, a priori knowledge and other considerations connected with the nature of the peers 20 involved. For example, peers 20 involved in financial transactions can benefit upon user intervention to ensure security. However, personalization of user-owned appliances and many other connection scenarios need not rely on user intervention.

Figure 10:
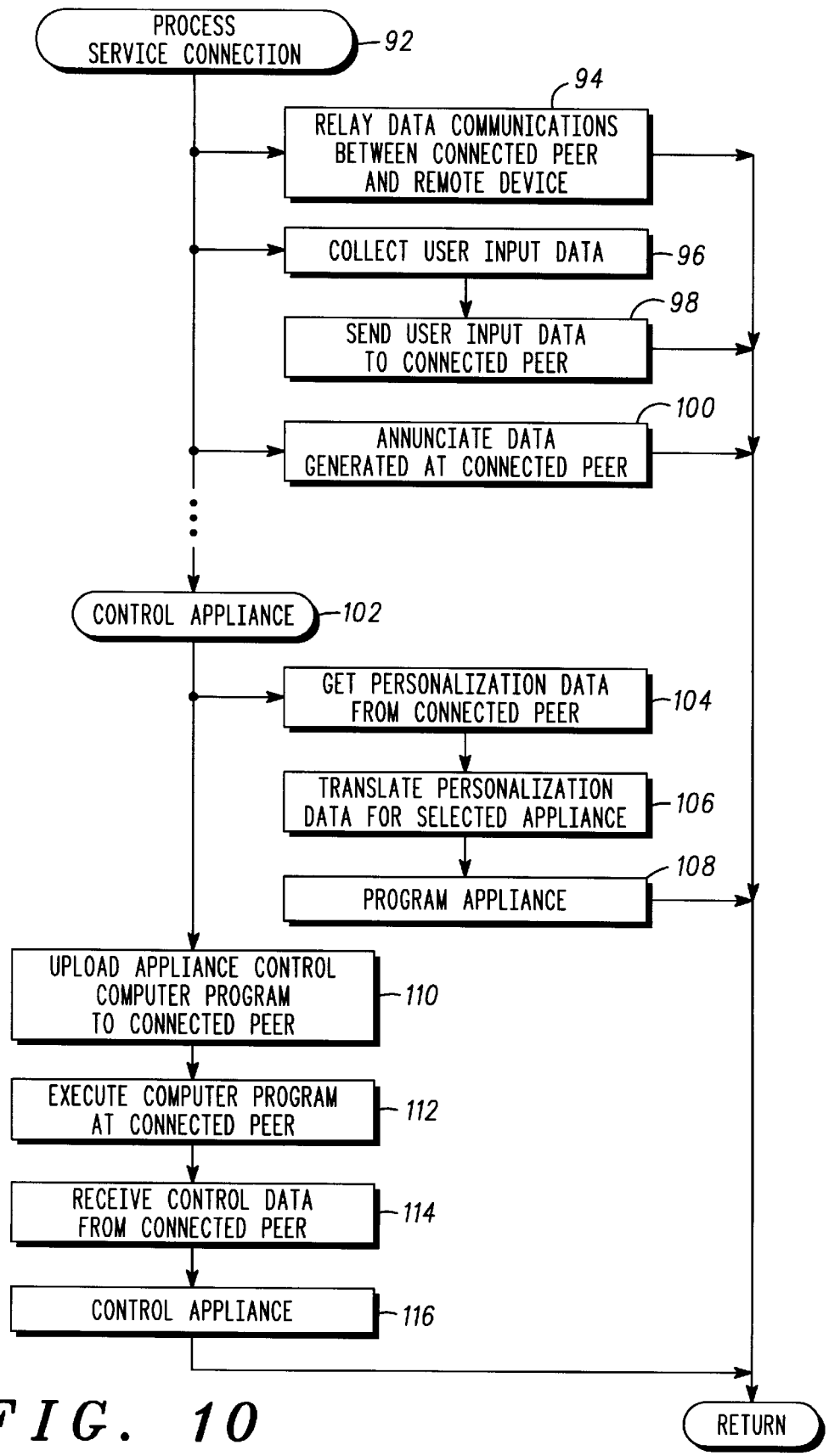
FIG. 10 shows an exemplary flow chart of a process service connection procedure performed at a peer.

FIG. 10 is a flow chart of process service connection procedure 92. Procedure 92 illustrates a collection of tasks which can be performed at a service-providing peer 20 in support of a service connection. Not all peers 20 need to be able to perform all the tasks depicted in FIG. 10. Likewise, many peers 20 may include other tasks which suit the nature of those particular peers 20.

Procedure 92 performs a task 94 to provide a network relay, router or gateway capability for a service-receiving peer 20 of network 22 through an established service connection. During task 94, a service-providing peer 20 relays data communications between the connected peer 20 and a remote device 34 (FIG. 1). After task 94, program flow returns to process 56 (FIG. 6). Task 94 may be used to extend the service connection to the Internet or other network.

Procedure 92 performs tasks 96 and 98 to provide a user input capability for a service-receiving peer 20 of network 22 through an established service connection. During task 96, the service-providing peer 20 collects user input from its I/O section 46 (FIG. 2). During task 98, the service-providing peer 20 sends the collected user input data to the connected service-receiving peer 20. After task 98, program flow returns. Tasks 96 and 98 may be used to control or program appliances from a PDA or other device which may have enhanced user input capabilities.

Procedure 92 performs task 100 to provide user output capability for any service-receiving peer 20 of network 22 through an established service connection. During task 100, the service-providing peer 20 receives data generated from the service-receiving peer 20 over the service connection and annunciates the data at an output device in its I/O section 46 (FIG. 2). The data may be annunciated in audibly and/or visibly perceivable format or in any other format(s) perceivable by human senses. After task 100, program flow returns. Task 100 may be used to annunciate data collected in a portable peer 20 at a non-portable annunciating device. Alternatively, task 100 may be used to annunciate data generated by a stationary appliance with limited I/O capability at a portable annunciating device.

Procedure 92 performs control appliance process 102 to support the controlling of appliances. Tasks 104, 106 and 108 of process 102 are performed to program an appliance peer 20 with personalization data 52 (FIG. 2). During task 104, a service-providing peer 20 gets personalization data 52 from the connected, service-receiving peer 20 using the service connection. Next, task 106 translates the network compatible personalization data 52 into a format suitable for the specific appliance to be programmed with personalization data 52. Those skilled in the art will appreciate that not all personalization data 52 available in a service-receiving peer 20 need to be applicable to all appliances. Thus, task 106 can use as much of personalization data 52 as applies to the specific appliance. After task 106, task 108 causes the appliance to be programmed with the translated personalization data 52. After task 108, program flow returns.

Tasks 110, 112, 114, 116 are performed to allow a user to easily control an appliance. These tasks can be performed on a PDA, for example, which has a display and user input capability exceeding the user I/O capabilities typically found on appliances. In this case, an appliance is a service-receiving peer 20 while the PDA is a service-providing peer 20. During task 110, the service-receiving peer 20 uploads an appliance control computer program to the connected service-providing peer using the service connection. Next, during task 112 the service-providing peer 20 executes the just-uploaded computer program. Task 112 causes the service-providing peer 20 to become specifically configured to provide a desirable user interface for the specific appliance being controlled. Next, during task 114 control data are received at the service-receiving peer 20 over the service connection. The control data originated from user input is supplied through the control computer program being executed on the service-providing peer 20. After task 114, task 116 controls the subject appliance in accordance with the control data received in task 114. After task 116, program flow returns.

EXAMPLE I

Figure 11:
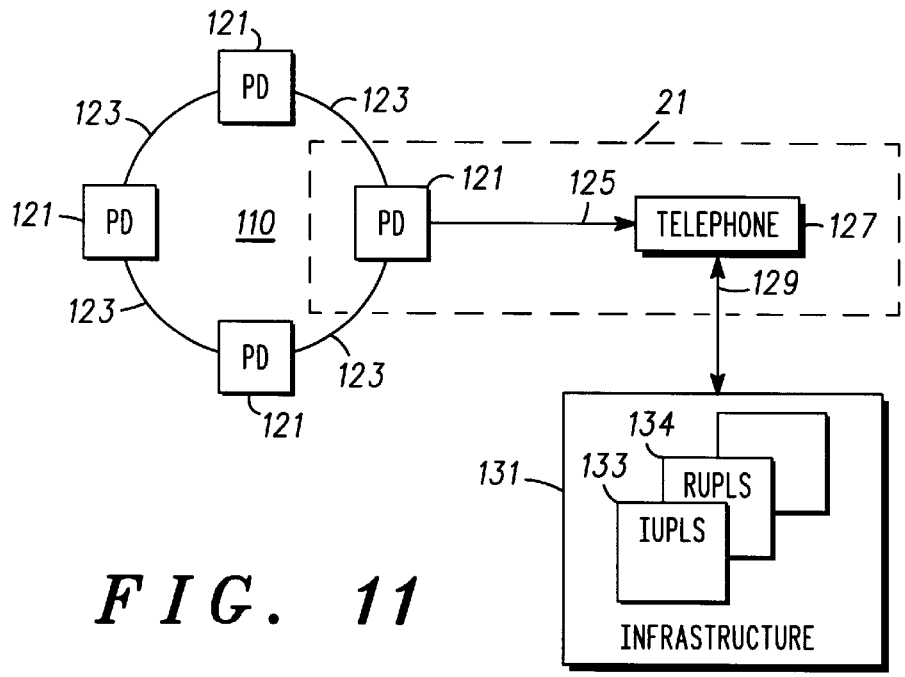
FIG. 11 is a block diagram illustrating relationships between a personal area network, a communications device and an external infrastructure.

FIG. 11 is a block diagram illustrating relationships between personal area network 120, communications device 127 and external infrastructure 131. Personal area network 120 comprises personal devices 121 interlinked via, for example, RF interconnections, represented as links 123. Personal area network 120 is linked to communications device 127 via RF link 125 and in turn via link 129 to external infrastructure 131 comprising, in this example, personalized records describing either an individual user's preferences, location and/or statistics (IUPLS) or a roaming user's preferences, location, local telephone number and/or statistics (RUPLS). Each of personal devices 121 and telephone 127 is equipped with a bidirectional RF linkage device such as RF linkage device 135 of FIG. 12.

Figure 12:
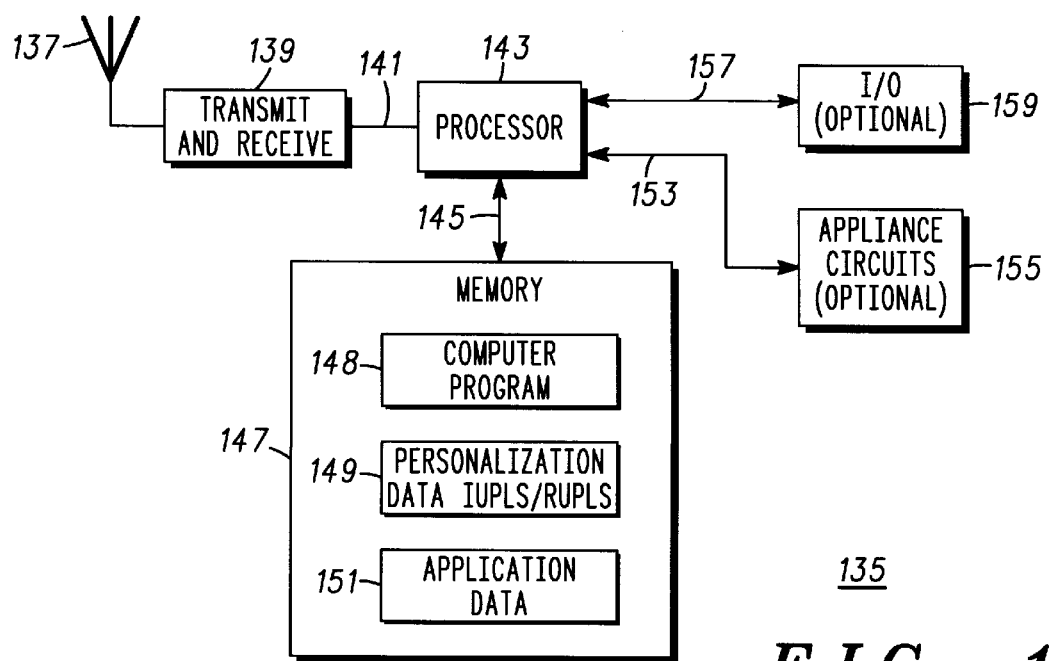
FIG. 12 is a block diagram of an exemplary peer communications and control device.

FIG. 12 is a block diagram of exemplary peer communications and control device 135, analogs to that of FIG. 2, comprising antenna 137 coupled to T/R module 139, processor 143, memory 147, optional I/O device 159 and optional appliance circuits 155, analogous to antenna 36, transmit and receive section 38, processor 40, memory 42, optional I/O section 46 and optional appliance circuits 48 of FIG. 2, respectively. Optional gateway interface 44 of FIG. 2 may be a separate element, as shown in FIG. 2, or may be subsumed under the aegis of optional I/O device 159, as in the system illustrated in FIG. 12. When present, optional I/O device 159 is linked to processor 143 via link 157 while optional appliance circuits 155 are linked to processor 143 via link 153. Processor 143 couples to T/R module 139 via link 141 and to memory 147 vi link 145. Memory 147 includes computer program(s) 148, personal data 149 including IUPLS 133, RUPLS 134 and application data 151. Application data 151 includes device configuration preferences, network topologies and the like.

Appliance circuits 155 or 48 (FIG. 2) are adapted to interface to control systems associated with a given appliance. These may be included with the appliance when manufactured or appliance circuits 155 or 48 may be adapted to retrofit an appliance that was not manufactured with a personal networking capability. In either case, memory 147 includes data relevant to control of the appliance, such as internal commands, capabilities, interface protocol and/or interface commands as well as information allowing appliance circuits 155 or 48 to program and assert at least a measure of control over the appliance through commands generated by processor 143 in response to information coupled via antenna 26 or 137.

Memory 147 is configured to allow data therewithin to be rewritten or updated as circumstances change. An example of a transaction in which such changes occur is described in connection with FIG. 13 and associated text.

T/R module 139 (analogous to transmit and receive module 38, FIG. 2) is usefully a DTR-9000 from Radio design Group, Inc., 3810 Almar Road, Grants Pass Oreg. 97527-4550 while processor 143, memory 147 and optional I/O device 159 are usefully an MPC821 microprocessor available from Motorola of Phoenix, Ariz., Austin, Tex. and Schaumburg, Ill.

Figure 13:
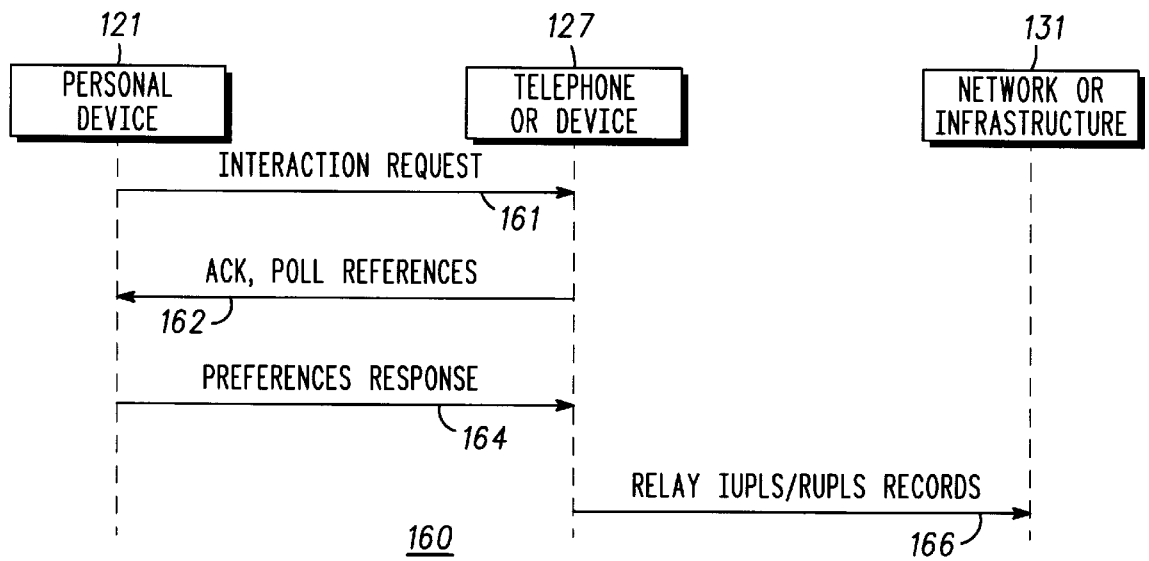
FIG. 13 is a diagram illustrating a sequence of data exchange messages between the devices of FIG. 11.

FIG. 13 is a diagram illustrating a sequence of data exchange messages between the devices of FIG. 11. Personal device 121 of FIG. 11 (analogous to device 20, FIG. 1) initiates the exchange of data with interaction request 161 directed to telephone 127, for example. Telephone 127 acknowledges interaction request 161 with message 162 and polls personal device 121 for preferences with message 162. Personal device 121 then provides preferences response 164 to telephone 127. Telephone 127 then sends message 166 to network or infrastructure 131 including location information and/or IUPLS 133 and/or RUPLS 134, depending on the nature of the data contained in preferences response 164. This type of interchange could occur when a person enters an area and the person's personal communications device begins to interact with a network of appliances that are relatively fixed in some environment. For example, a client who walks into a doctor's office might have a personal digital assistant that interacts with the appliances in the doctor's office to tell the infrastructure where the person is and to have all calls to the person's home and/or office telephone rerouted to the doctor's office phone. This type of transaction is described below with reference to FIG. 14 and associated text.

Figure 14:
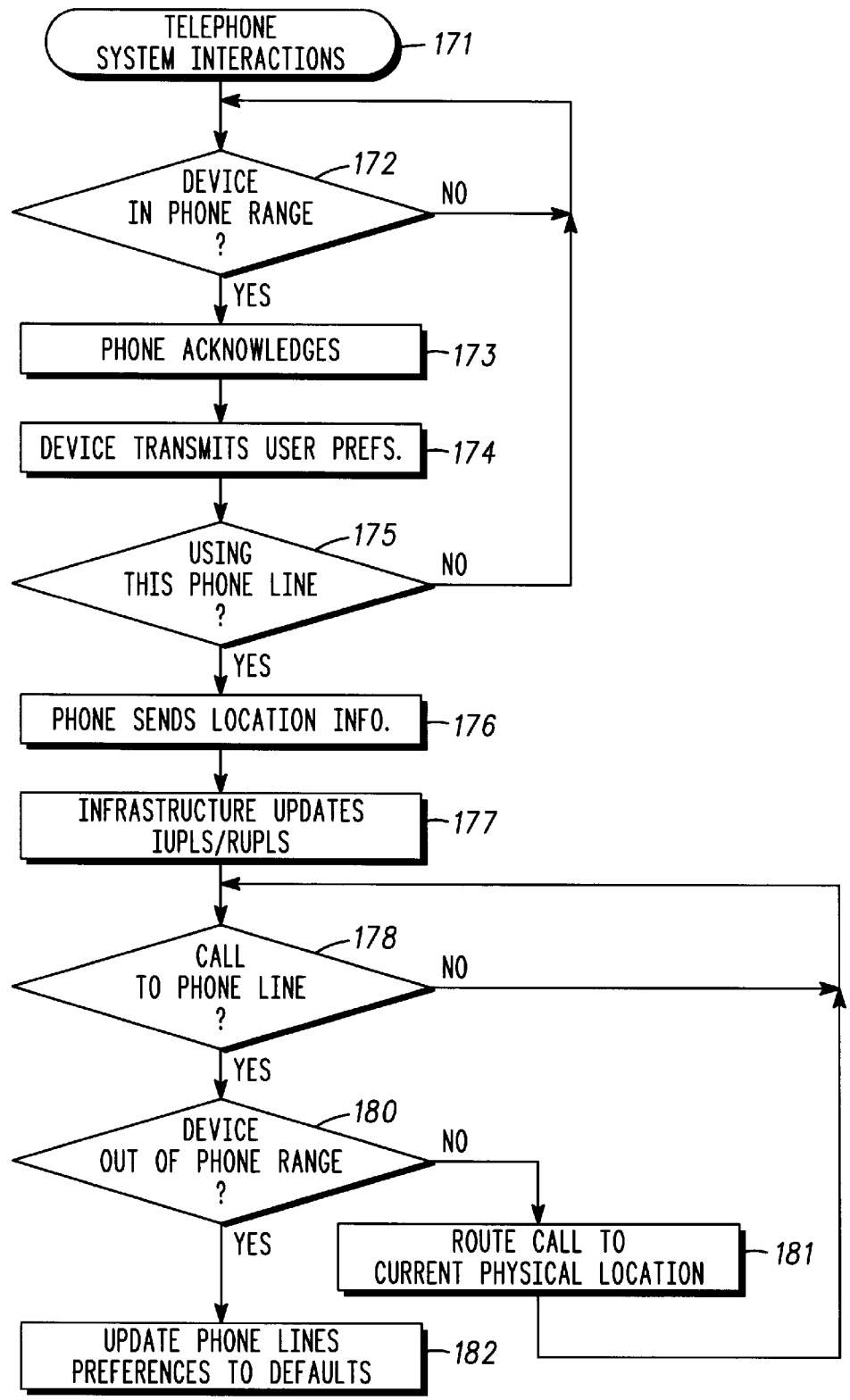
FIG. 14 is a flow chart outlining steps in the data communications sequence of FIG. 13 for the devices of FIG. 11.

FIG. 14 is a flow chart of process 170 outlining steps in data communications sequence 160 (FIG. 13) for devices 121, 127 (FIG. 11). Process 170 begins with telephone system interactions 171 with telephone 127 (FIG. 11). When the process determines that a personal device 121 is in range of phone 127 (block 172), telephone 127 acknowledges that personal device 121 is in range (block 173). In return, personal device 121 transmits user preferences (block 174). When personal device 121 indicates that the line coupled to telephone 127 is not to be used to transmit data or when personal device 121 is not in range of phone 127, control loops back to block 172. When personal device 121 indicates (block 175) that the line coupled to phone 127 is to be used to transmit or receive data, phone 127 sends location information (block 176) to infrastructure 131. The location information describes the location and telephone number(s) for telephone 127, which includes the location of the user because the user is within range of telephone 127. This information is used to update RUPLS 134 when telephone 127 is not the user's phone or in the user's usual haunts and is used to update RUPLS 134 and IUPLS 133 when the user returns home or to the office. When this phone line is not to be used, for whatever reason, program control loops back to the test of block 172. Additionally, when physical motion of the personal device 121 or when another personal device 121 through which personal device 121 is establishing connection to the network moves out of range, the program steps through decision block 180 to update preferences to defaults (block 182) or to set them to those from another personal device 121 that is in range of the television.

When a call is made to the user's home or office phone (block 178), the call is routed to the user's current location (block 181) provided that the system determines that the user is still within range of telephone 127 (block 180). When it is determined that the user is no longer within range of telephone 127 (block 180), telephone 127 updates the phone line preferences to default values (plus any deriving from interactions that telephone 127 may be having with other users).

EXAMPLE II

Figure 15:
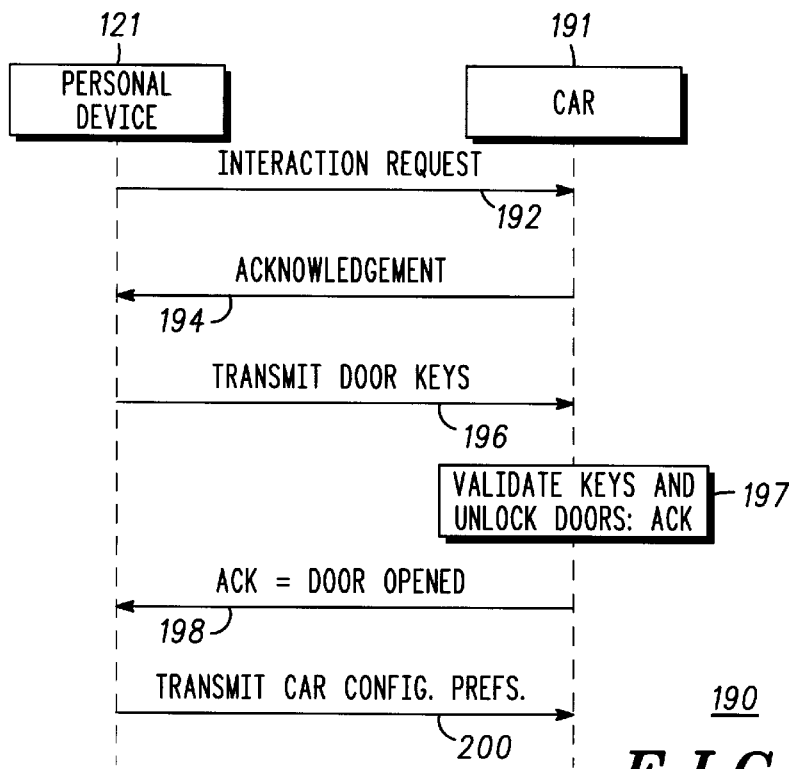
FIG. 15 is a diagram illustrating a sequence of data exchange messages between another set of devices.

FIG. 15 is a diagram illustrating sequence 190 of data exchange messages between another set of devices 121, 191. In this example, personal device 121 is carried by a user who is approaching, for example, rental car 191, which is equipped with and controlled by a peer analogous to personal devices 121 (FIG. 11), 135 (FIG. 12) or peers 20 (FIG. 1), 21 (FIG. 2). Personal device 121 transmits interaction request 192. Car 191 transmits acknowledgment 194 back to personal device 121 via hardware 135, 21. Personal device 121 transmits car keys (electronic codes unique to car 191) to hardware 135 or 21 in car 191 (car keys were loaded into personal device 121 in the course of making arrangements for rental of car 191). Car 191 then validates the car keys via hardware 135, 21, unlocks the doors and acknowledges receipt of the car keys (block 197), again via hardware 135, 21.

Acknowledgment message 198 from hardware 135, 21 of car 191 to personal device 121 coincides with opening of the car door by the user. Personal device 121 transmits car configuration preferences to hardware 135, 21 of car 191 in message 200. Car 191 then accommodates as many of these preferences as possible, by setting seat position and height, mirror adjustments, lighting levels and personal device adjustments (i.e., setting a radio to a desired station etc.). These operations are described in more detail with reference to FIG. 16 and associated text.

Figure 16:
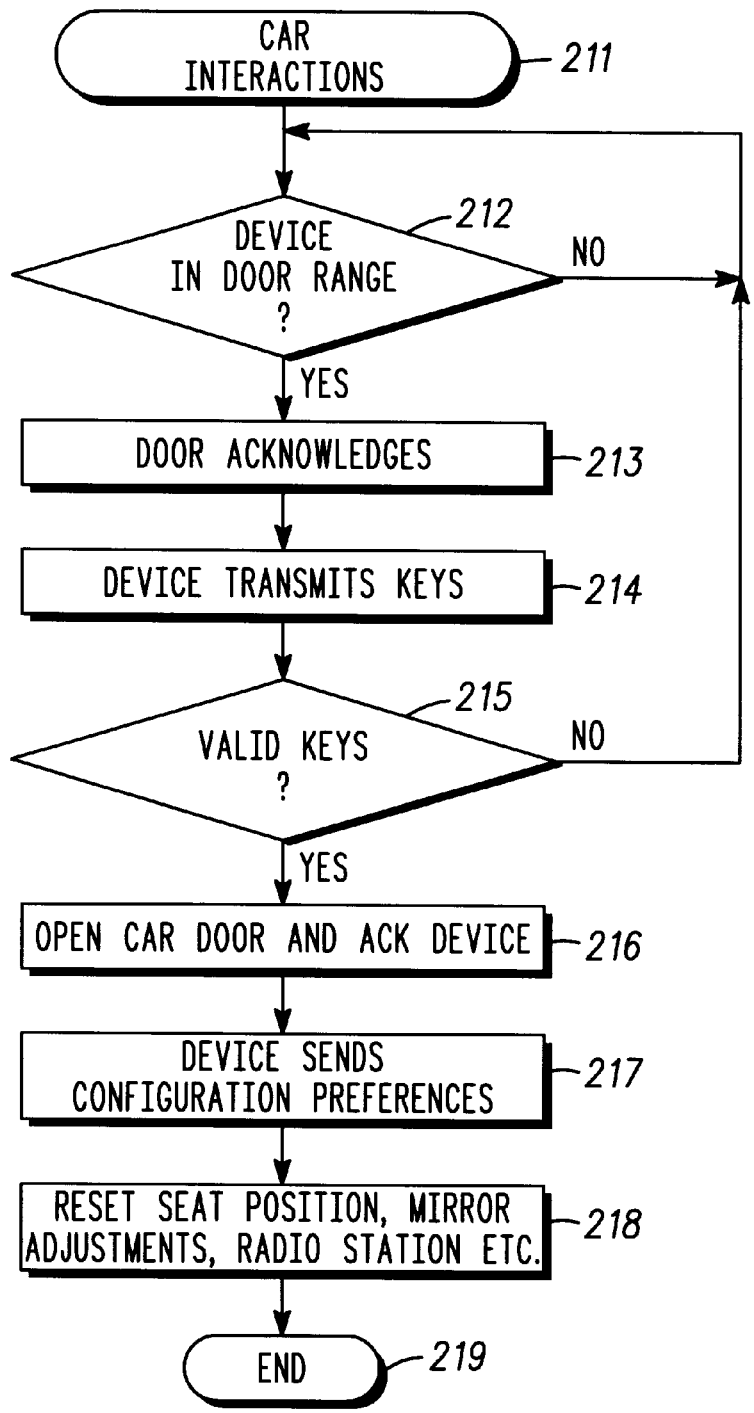
FIG. 16 is a flow chart outlining steps in the data exchange sequence of FIG. 15.

FIG. 16 is a flow chart of process 210 outlining steps in data exchange sequence 190 of FIG. 15. Process 210 begins when personal device 121 forms a personal network with car 191 (block 211) via hardware 135, 21. When step 212 determines that personal device 121 is in door range of hardware 135, 21, an acknowledgment signal is sent (block 213) from hardware 135, 21 of car 191 and personal device 121 transmits car keys (block 214). Car 191/hardware 135, 21 then determines if the car keys are valid (block 215). When personal device 121 is not in range of hardware 135, 21 of car 191 or when the car keys are not valid for this car 191, program control loops back to block 212. When the car keys are valid, car 191 unlocks and opens the car door and sends an acknowledgment to personal device 121 (block 216) vi hardware 135, 21. Personal device 121 then sends configuration preferences to hardware 135, 21 of car 191 (block 217). Car 191 then accommodates these preferences as described above in conjunction with text associated with FIG. 16.

EXAMPLE III

Figure 17:
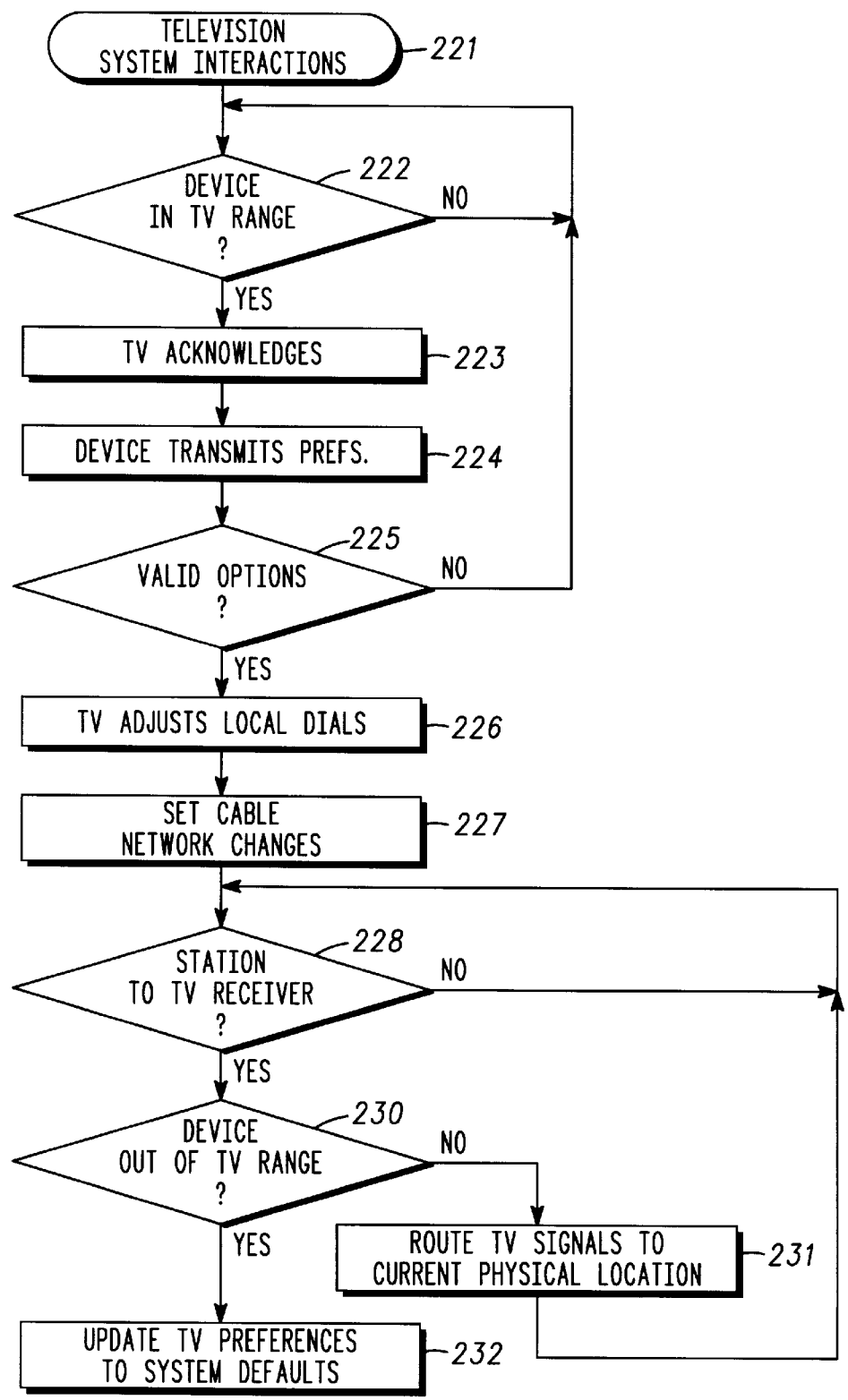
FIG. 17 is a flow chart outlining steps in a data exchange sequence between yet another set of devices.

FIG. 17 is a flow chart of process 220 outlining steps in a data exchange sequence between yet another set of devices. Process 220 begins (block 222) when personal device 121 comes in range of a television. The television acknowledges (block 223) presence of personal device 121. Personal device 121 transmits (block 224) preferences such as channel or network, volume level, contrast and the like. When the options or preferences are not valid options for this television or when personal device 121 is not in range of the television, control loops back to block 221. The television then accommodates these preferences (block 226) and sets any cable network changes that are transmitted (block 227).

In response to the messages that were sent in conjunction with the tasks of block 227, the system routes the desired station to television receiver (block 228). Additionally, when physical motion of the personal device 121 or when another personal device 121 through which personal device 121 is establishing connection to the network moves out of range, the program steps through decision block 230 to update TV preferences to system defaults (block 232) or to set them to those from another personal device 121 that is in range of the television. When this does not occur, the chosen TV signals are routed to the TV (block 231) and displayed.

EXAMPLE IV

Figure 18:
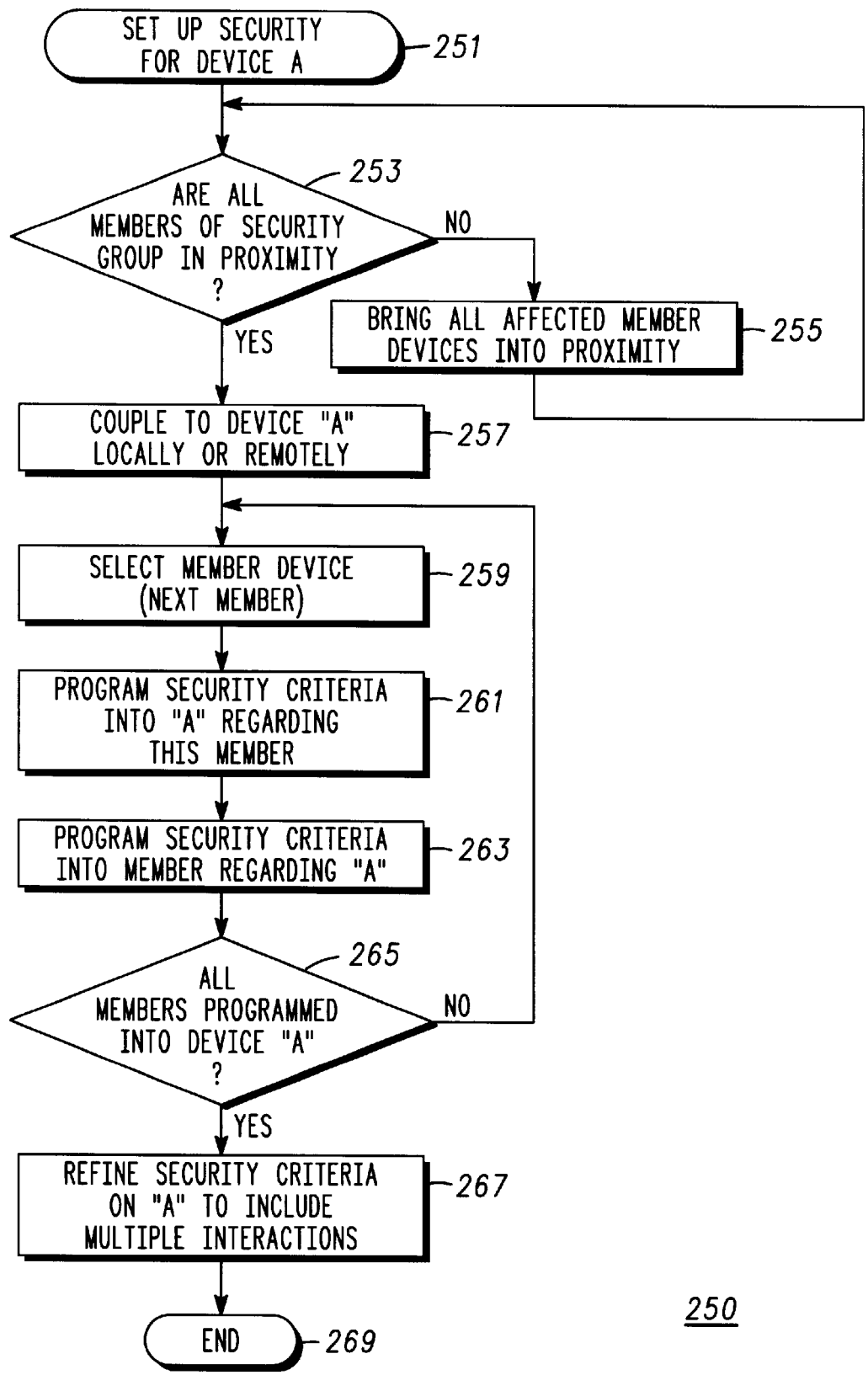
FIG. 18 is a flowchart outlining a procedure for the introduction of a new appliance into an established personal area network.

FIG. 18 is a flowchart outlining procedure 250 for the establishment of security criteria for device A. Procedure 250 assumes that (i) the person programming device A has authority to do so (based on an ownership code, password and the like) and (ii) the person programming each of the member devices has the authority to do so (based on an ownership code, password and the like). A member is a device that device A expects to be in proximity with; when the member device is not in proximity, device A may be missing. Rules governing the proximity relationship can be determined by the person having authority to do so. For example, the proximity relationship could be to limit either or both the number of communication relays or the physical distance separating the member devices from device A. An example of how this can be accomplished is by each communication being tagged with a relay count, i.e., a count that is incremented each time a message passes from one device 121 to another device 121.

When devices 121 come into proximity, they detect each other (see FIG. 1 and associated text). At this point, they could potentially network together but they have not yet done so. After a short negotiation, each device 121 decides whether it wants to network with the other device 121. When both devices 121 agree to participate in a dialog, devices 121 couple, i.e., are in data communication. Note that a dialog between two devices 121 beyond the initial negotiation may never occur, but they are considered to be coupled because they know of each other's existence, they have a mechanism established for communication and they have agreed that they can participate in a dialog.

On the contrary, devices 121 that are in proximity may elect not to participate in a dialog with each other, and, even though they are capable of detecting each other, they are not networked. This situation might occur because two devices 121 are owned by two different individuals, and each device 121 has been instructed that it is only to dialog with other devices 121 owned by the same individual. In this way peer devices 121 can selectively ignore other devices 121 even though they are in proximity. This can be accomplished with unique ownership identification codes, or some other technique well known to those skilled in the art.

This technique serves the situation where a first person has devices 121 in an apartment where they are in proximity to another person's devices 121 in another apartment. Even though these devices 121 can detect each other, they will not network together if they have been programmed to only network with other devices 121 owned by the same individual. Of course, other authorization schemata exist and could be employed by those skilled in the art, e.g., devices 121 can be networked together and separated into disjoint sets called security sub-groups.

Procedure 250 begins (block 251) when the security criteria for a specific device 121 ("device A") is programmed into device A. In the case where devices 121 do not have intrinsic input capabilities, this programming may be effected via an RF link, hardwired link, or optical link; at the opposite end of the chosen link there is an interface device, such as a keyboard, voice recognition system or similar device, for programming device A. The first step determines (block 253) if all devices 121 of a specific security group are in proximity or in data communication with device A. When this is not the case, the program may either strive to effect communication with the available network or wait until the missing member devices 121 are brought into proximity/data communication with the network (block 255).

In either case, the coupling step (block 257) precedes programming device A with information that may desirably contain the security needs regarding other devices in device A's security group (blocks 259-265).

In particular, security information relevant to member device 121 is programmed into device A (block 261) and security information relevant to device A is programmed into member device 121 (block 263). Additionally, device A may be programmed to be recognized by one or more of the following: a security group unit serial number, a unique security group identifier that identifies the owner, a physical address and/or a telephone number for the usage site and the like.

Security criteria for member devices 121 may involve specifications that are both inclusive and exclusive. For example, an inclusive specification might be "when I no longer see device B then I am missing". An exclusive specification might be "If I see device D then I am missing".

Desirably, when all such member devices 121 in the security group have been programmed with each other's data, security information with respect to device A is refined to include multiple interactions (block 267) and program 250 ends (block 269). For example, suppose that device A's security group includes three devices named B, C and D. In block 267 the security criteria contained within device A could be refined with inclusive statements like "If any two of the devices B, C, D are absent for two hours or more then I am missing". The criteria could also be refined with exclusive statements like "If I ever see devices C and D within three minutes of each other then I am missing".

When it is not the case that all member devices 121 have been programmed with each other's data, control reverts to block 259, another member device 121 is selected and the steps of blocks 259-265 are repeated until all member devices 121 nominally comprising the security group have been programmed.

Note that when a security group is established for device A, the security group exists with respect to device A only. For example, suppose device A has one member device B in its security group. On the other hand, device B may define a security group of its own, e.g., with device C as its member. This does not, however, establish any implied relationship from B to A, nor between A and C. So just because B is a member of A's security group does not imply that A is a member of B's security group, nor does it imply that C is a member of A's security group. This scheme allows for great flexibility in the implementation of the present invention.

Figure 19:
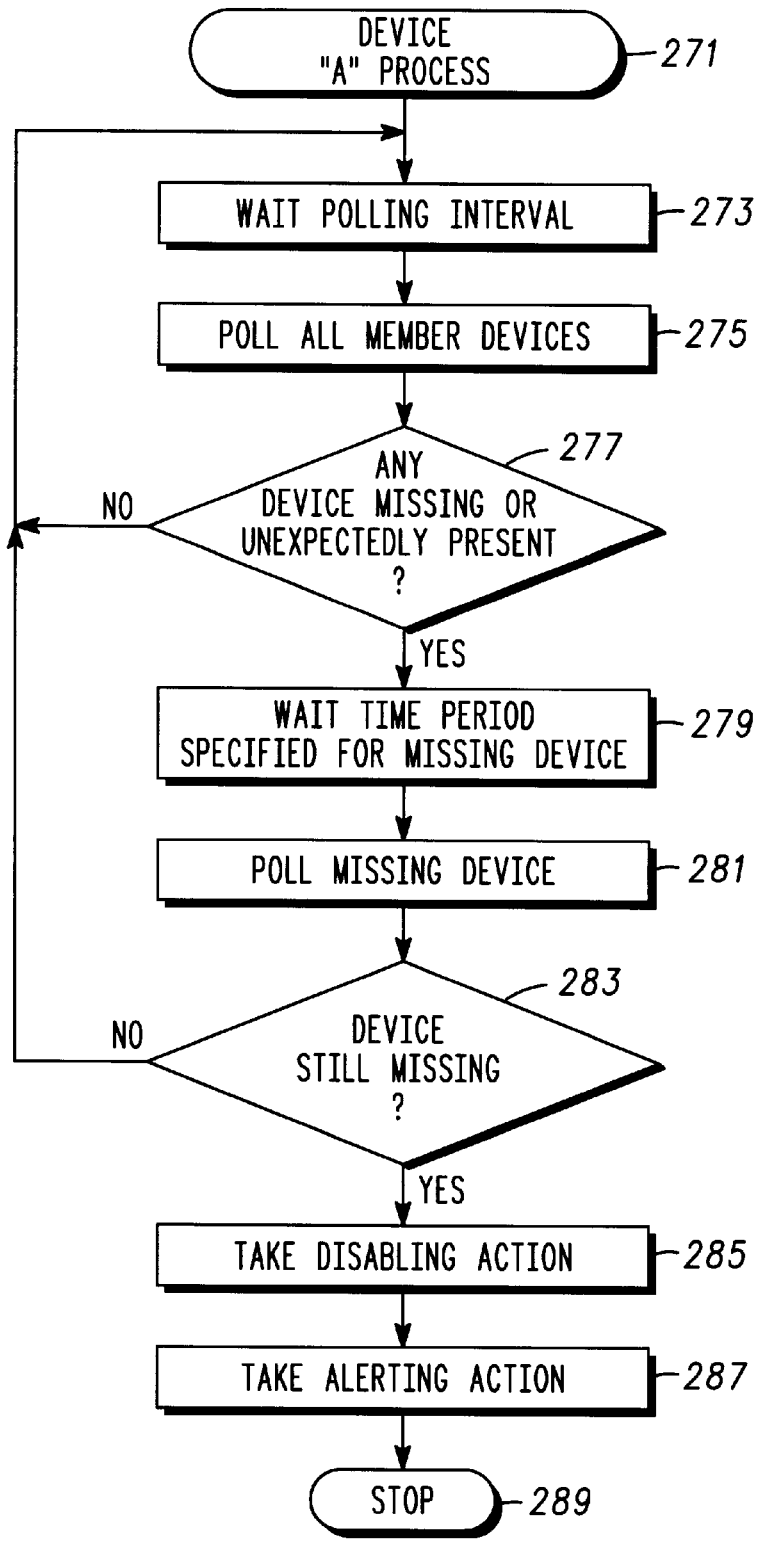
FIG. 19 is a flowchart outlining a polling/alarm procedure for use in a personal area network.

FIG. 19 is a flowchart outlining polling/alarm procedure 270 for use in conjunction with a security group. Procedure 270 begins (block 271) by device A waiting a prescribed polling interval (block 273). The polling interval may be specific to the nature of device A and may vary from a very short (e.g., five minutes) polling interval in some cases to relatively long polling intervals for other types of devices (e.g., a day).

Following the polling interval wait, device A may poll all members 121 in the security group (block 275) to determine whether or not they are in proximity. When this has been accomplished, device A determines (block 277) if any members 121 are missing from the security group. When no members 121 are missing from the security group and no devices 121 are present that are not expected, program control passes back to block 271/273 and steps outlined in blocks 273–277 repeat at appropriate intervals.

When it is determined (block 277) that a member 121 is missing from the security group, or that an unexpected member 121 is present, device A waits (block 279) a specified interval for the return or removal of the missing device and then polls (block 281) the missing member. When the member 121 is determined (block 283) not to be actually missing, control passes to block 271/273 and steps outlined in blocks 273–277 are repeated. When the member 121 is determined (block 283) to actually be missing or unexpectedly present, affirmative action such as taking steps to disable the device (block 285) and/or raise an alarm (block 287) is taken, prior to procedure 270 ending (block 289).

The alarm condition may include having device A (i) shut down (block 285), (ii) attempt to place a call to police for help (block 287), (iii) attempt to place a call to a central appliance authority for help or for an override code (block 287), or (iv) interact with neighboring devices (block 287), in order to attempt to place a call per (ii) or (iii). When an ordinary telephone line is used to effect the call, the physical address is usually easily determined from the identity of the line on which the call is placed.

In summary, the present invention provides an improved capability addressable network and corresponding method. This network is suitable for interconnecting a plurality of everyday electronic devices, including movable and portable devices that provide a vast and diverse assortment of services. A priori activation and setup procedures are not required in this network because no network specific equipment requires network addresses in order to make connections. Although device addresses are not needed to establish connections, device names must be known by connected peers before meaningful communication can be established and information exchanged. In this context, a device or peer name is simply a unique identifier that allows one device or peer 20 to be uniquely distinguished from any other device or peer 20. Consequently, a minimal amount of user involvement is needed to make connections to peers and peers may make connections to new peers as a routine matter. Network node addressing is dynamically configurable because network connections are formed based upon proximity and upon a needs and capabilities evaluation rather than on unique network-wide address encoding.

Although the preferred embodiments of the invention have been illustrated and described in detail, it will be readily apparent to those skilled in the art that various modifications may be made therein without departing from the spirit of the invention or from the scope of the appended claims.

What is claimed is:

1. In a dynamically configurable personal area network established by at least two autonomous peer to peer members being in proximity to one another at any given moment such that a communication link exists therebetween and which is not affected by additional peer members moving into or exiting from the personal area network, a method for including a peer appliance, said method comprising steps of:
   a) determining, by said personal area network, that said peer appliance should be included in said personal area network by an individual one or ones of the peer members of the personal area network querying said peer appliance;
   b) determining, by said personal area network, that individual peer members of said personal area network are in data communication with said personal area network; and
   c1) when individual peer members of said personal area network are in data communication with said personal area network, performing substeps of:
      i) selecting a selected peer member of said personal area network;
      ii) establishing a communication link to said peer appliance to determine if said peer appliance should be in a security group to which said selected peer member belongs;
      iii) programming security criteria relevant to said selected member into said appliance from said selected peer member; and
      iv) programming security criteria relevant to said peer appliance into said selected member from said peer appliance.

2. A method as claimed in claim 1, wherein said step a) includes a substep of determining that a person who is programming said peer appliance has authority to do so based on a first security code chosen from a group consisting of an ownership code and a password.

3. A method as claimed in claim 1, further comprising steps of:
   c2) when not all individual peer members of said personal area network are in data communication with said personal area network, performing substeps of:
      i) waiting a first prescribed interval; and
      ii) repeating said step b); and
   c3) when all individual peer members of said personal area network are in data communication with said personal area network, performing substeps of:
      i) determining if any peer members of said personal area network have not been programmed with security criteria relevant to said peer appliance; and
      ii) selecting one of said any peer members as said selected peer member; and
      iii) performing substeps c1) iii), c1) iv) and c3) i) through iii) for said selected peer member.

4. A method as claimed in claim 2, further comprising a step of inhibiting said peer appliance from communicating with devices that are not members of said personal area network.

5. In an appliance, a method for becoming a peer member of a dynamically configurable personal area network that comprises two or more peer members, said method comprising the steps of:

a) determining, by said appliance, that said personal area network should be included by said appliance;

b) waiting for a signal from an individual one or ones of the peer members of the personal area network querying said appliance, said signal indicating that individual peer members of said personal area network are in data communication with said personal area network; and c1) when a signal from said personal area network indicates that individual peer members of said personal area network are in data communication with said personal area network, performing substeps of:
  i) waiting for a signal indicating that a peer member of said personal area network has been designated as a selected member;
  ii) accepting data including security criteria relevant to said selected member and storing said data in memory in said appliance; and
  iii) providing security criteria relevant to said appliance to said personal area network.

6. A method as claimed in claim 5, wherein said step a) includes a substep of determining that a person who is programming said appliance has authority to do so based on a first security code chosen from a group consisting of an ownership code and a password.

7. A method as claimed in claim 5, further comprising steps of:
  c2) when a signal from said personal area network indicates that not all individual peer members of said personal area network are in data communication with said personal area network, performing substeps of:
    i) waiting a first prescribed interval; and
    ii) repeating said step b); and
  c3) when a signal from said personal area network indicates that all individual peer members of said personal area network are in data communication with said personal area network, performing substeps of:
    i) waiting for a signal indicating when any peer members of said personal area network have not been programmed with security criteria relevant to said appliance; and
    ii) waiting for a signal indicating that one of said any peer members has been selected as said selected member; and
    iii) performing substeps c1) iii), c1) iv) and c3) i) through iii) for said selected member.

8. A method as claimed in claim 6, further comprising a step of inhibiting said appliance from communicating with devices that are not members of said personal area network.

9. An apparatus for including an appliance in a dynamically configurable personal area network consisting of two or more peer appliances, said apparatus comprising:
  a receiver for receiving input data;
  a transmitter for transmitting output data; and
  an apparatus for interactively coupling said appliance to said personal area network, said interactive coupling apparatus coupled to said receiver and to said transmitter to effect data communication therewith, said interactive coupling apparatus for:
    a) initiating a setup connection between said one appliance and at least one of said peer appliances of said network;
    b) determining, by said appliance, that said personal area network should be included by said appliance;
    c) waiting for a signal from an individual one or ones of the peer appliances of the personal area network querying said appliance, said signal indicating that individual peer appliances of said personal area network are in data communication with said personal area network; and
  d1) when all individual peer appliances of said personal area network are in data communication with said personal area network, performing substeps of:
    i) waiting for a signal indicating that a peer appliance of said personal area network has been designated as a selected peer appliance;
    ii) accepting data including security criteria relevant to said selected peer appliance and storing said data in memory in said appliance; and
    iii) providing security criteria relevant to said appliance to said personal area network.

10. An apparatus as claimed in claim 9, further including means for determining that a person who is programming said appliance has authority to do so based on a first security code chosen from a group consisting of an ownership code and a password.

11. An apparatus as claimed in claim 9, wherein said interactive coupling apparatus is further for:
  d2) determining when a signal from said personal area network indicates that not all individual peer appliances of said personal area network are in data communication with said personal area network and then performing substeps of:
    i) waiting a first prescribed interval; and
    ii) repeating said step b); and
  d3) determining when a signal from said personal area network indicates that all individual peer appliances of said personal area network are in data communication with said personal area network and then performing substeps of:
    i) waiting for a signal indicating when any peer appliances of said personal area network have not been programmed with security criteria relevant to said appliance; and
    ii) waiting for a signal indicating that one of said any peer appliances has been selected as said selected peer appliance; and
    iii) performing substeps d1) ii), d1) iii) and d3) i) through d3) iii) for said selected member.

12. An apparatus as claimed in claim 10, further comprising means for inhibiting said appliance from communicating with devices that are not members of said personal area network.

13. An apparatus for rendering an appliance a member of a dynamically configurable personal area network consisting entirely of individual peer members, said apparatus comprising:
  a receiver for receiving input data;
  a transmitter for transmitting output data; and
  an apparatus for interactively coupling said appliance to said personal area network, said interactive coupling apparatus coupled to said receiver and to said transmitter to effect data communication therewith, said interactive coupling apparatus for:
    a) determining, by said personal area network, that said appliance should be included in said personal area network by an individual one or ones of the peer members of the personal area network querying said appliance;
    b) determining, by said personal area network, that individual peer members of said personal area network are in data communication with said personal area network; and c1) when individual peer members of said personal area network are in data communication with said personal area network, performing substeps of:
  i) selecting a selected peer member of said personal area network;
  ii) programming security criteria relevant to said selected peer member into said appliance by said selected peer member; and
  iii) programming security criteria relevant to said appliance into said selected peer member by said appliance.

14. An apparatus as claimed in claim 13, wherein said step a) includes a substep of determining that a person who is programming said appliance has authority to do so based on a first security code chosen from a group consisting of an ownership code and a password.

15. An apparatus as claimed in claim 13, wherein said interactive coupling apparatus is further for:
  c2) determining when not all individual peer members of said personal area network are in data communication with said personal area network and then performing substeps of:
    i) waiting a first prescribed interval; and
    ii) repeating said step b); and
  c3) determining when all individual peer members of said personal area network are in data communication with said personal area network and then performing substeps of:
    i) determining if any peer members of said personal area network have not been programmed with security criteria relevant to said appliance; and
    ii) selecting one of said any peer members as said selected member; and
    iii) performing substeps c1) ii), c1) iii) and c3) i) through c3) iii) for said selected member.

16. An apparatus as claimed in claim 14, further comprising means for inhibiting said appliance from communicating with devices that are not peer members of said personal area network.

17. An apparatus for determining when an appliance has become separated from a security group of a dynamically configurable personal area network comprised solely of peer members of which said appliance is a member, said apparatus comprising:
  a receiver for receiving input data;
  a transmitter for transmitting output data; and
  an apparatus for interactively coupling said appliance to said security group, said interactive coupling apparatus coupled to said receiver and to said transmitter to effect data communication therewith, said interactive coupling apparatus for:
    polling an area surrounding said appliance with an interrogation signal from an individual one or ones of the peer members of the personal area network querying said appliance, said signal being directed to said personal area network;
    waiting for a predetermined interval, said predetermined interval being in a range of from a few minutes to up to two weeks;
    repeating said polling step; and
    when said polling step does not result in receipt of a signal from said personal area network, initiating an alarm sequence.

18. An apparatus as claimed in claim 17, wherein said interactive coupling apparatus is further for:
  determining if a suitable personal area network is in range for data communication; and
  sending a message to said personal area network to communicate a distress state.

19. An apparatus as claimed in claim 18, wherein said interactive coupling apparatus is further for:
  sending a message to determine if a personal area network is in range for data communication that includes access to a telephone;
  receiving a message from a personal area network that is in range for data communication that includes access to a telephone; and
  sending a message to said personal area network to request that a call be made to a central appliance authority, said call to include information identifying said appliance, said security group and information describing said personal area network.

20. An apparatus as claimed in claim 18, wherein said interactive coupling apparatus is further for initiating inhibition normal appliance functions while said appliance is initiating an alarm sequence.

21. A method for determining when an appliance has become separated from a security group of a dynamically configurable personal area network consisting only of a plurality of peer members of which said appliance is a member, said method comprising steps of:
  polling all devices that are members of said security group with a signal from an individual one or ones of the peer members of the personal area network that are polling said appliance to determine if any of said devices are not in data communication with said security group;
  determining from responses to said polling step if any of said devices are not in data communication with said security group;
  waiting a predetermined interval;
  repolling said devices that were determined not to be in data communication with said security group during said determining step;
  redetermining if said devices that were determined not to be in data communication with said security group during said determining step are still not in data communication with said security group; and
  notifying a central authority that said devices that were determined not to be in data communication with said security group during said determining and redetermining steps are missing.

22. A method as claimed in claim 21, further including steps of:
  analyzing results from said polling step to determine if any devices not associated with said security group are in data communication with said security group; and
  identifying when said any devices source messages indicate a distress state.

23. A method as claimed in claim 22, wherein, when said identifying step identifies a distress state, said method further includes steps of:
  extracting information identifying said any devices from messages received from said any devices; and
  notifying a central authority of the presence and identity of said any devices and a location of said personal area network.

24. A method for determining when an appliance has become separated from a first security group of which said appliance is a member, said method comprising steps of:
  polling an area to determine if any devices not members of a second security group are in data communication with said second security group;
  analyzing results from said polling step to determine if any devices not associated with said second security group are in data communication with said second security group; and identifying when said any devices source messages indicate a distress state.

25. A method as claimed in claim 24, wherein, when said identifying step identifies a distress state, said method further includes steps of:

extracting information identifying said any device from messages received from said any device; and notifying a central authority of the presence and identity of said any device and a location of said second security group.

* * * * *